United States Patent [19]
Chapman et al.

[11] Patent Number: 5,700,386
[45] Date of Patent: Dec. 23, 1997

[54] PROCESS FOR MAKING SOIL RELEASE POLYMER GRANULES

[75] Inventors: Benjamin Edgar Chapman; Michael Timothy Creedon, both of Cincinnati, Ohio

[73] Assignee: The Procter & Gamble Company, Cincinnati, Ohio

[21] Appl. No.: 694,133

[22] Filed: Aug. 8, 1996

[51] Int. Cl.$^6$ .............................. C11D 1/722; C08K 5/06; C08K 31/06
[52] U.S. Cl. .............. 252/8.62; 252/8.61; 524/376; 524/559; 523/334; 510/299; 510/517; 510/528
[58] Field of Search ........................ 524/376, 559; 252/8.62; 523/334; 510/528

[56] References Cited

U.S. PATENT DOCUMENTS

| | | | |
|---|---|---|---|
| 4,020,015 | 4/1977 | Bevan | 252/544 |
| 4,877,896 | 10/1989 | Maldonado et al. | 560/14 |
| 4,999,128 | 3/1991 | Sonenstein | 252/174.14 |
| 5,041,230 | 8/1991 | Borcher, Sr. et al. | 252/8.9 |
| 5,182,043 | 1/1993 | Morall et al. | 252/174 |
| 5,196,133 | 3/1993 | Leslie et al. | 252/95 |
| 5,415,807 | 5/1995 | Gosselink et al. | 252/174.21 |
| 5,451,341 | 9/1995 | White | 252/174.21 |

FOREIGN PATENT DOCUMENTS

| | | |
|---|---|---|
| 2 123 848 | 2/1984 | United Kingdom . |
| 2 137 221 | 10/1984 | United Kingdom . |

*Primary Examiner*—Tae Yoon
*Attorney, Agent, or Firm*—Daniel F. Nesbitt; Milton B. Graff; Donald E. Hasse

[57] ABSTRACT

The subject invention involves processes for making granular compositions comprising soil release polymers, the polymers comprising at least about 10% of substantially linear esters having a backbone; the esters being uncapped or end-capped on one or both ends of the backbone; the esters comprising in their backbones oxyalkyleneoxy units and hydrophobic aryldicarbonyl units; the esters having a molecular weight of from about 500 to about 20,000; the polymers if in solid state having the tendency when exposed to moisture to spontaneously rearrange from an amorphous form which is readily soluble in water to a crystalline form which is relatively insoluble in water; the process comprising the following steps:

a) taking the soil release polymers, in which are dispersed from 0% to about 25% alkylaryl or alkyl sulfonate crystallization-reducing stabilizers, in molten state at a temperature of at least about 180° C., and rapidly dissolving the molten polymers in water, forming an aqueous polymer solution having a polymer concentration of up to about 50%, the average temperature of the solution being maintained below about 50° C.;

b) dispersing a nonionic surfactant in the molten polymers or in the water prior to step a), the surfactant being an alkylethoxy alcohol nonionic surfactant which is a condensation product of alkylalcohol and ethylene oxide, the alkyl portion being linear or branched, saturated or unsaturated, having from about 8 to about 22 carbon atoms, there being on average of from about 10 to about 100 moles ethoxy per mole surfactant, the nonionic surfactant being from about 2% to about 20% of the aqueous polymer solution, on a dry weight basis; and c) drying the aqueous polymer solution of b), thereby producing a granular composition having a water content of less than about 3%.

The subject invention also involves soil release polymer granules comprising such polymers and nonionic surfactant and, optionally, stabilizers.

12 Claims, 2 Drawing Sheets

PROCESS FOR MAKING SOIL RELEASE POLYMER GRANULES

TECHNICAL FIELD

The subject invention involves processes for making granules of water-soluble soil release polymers useful as components of granular laundry products, and water-soluble soil release polymer granules suitable for dry blending with detergent granules.

BACKGROUND OF THE INVENTION

Various water-soluble soil release polymers useful as components of laundry products are well-known. Such soil release polymers may be components of detergent laundry products or fabric softener/antistatic products used for washing or rinsing fabrics.

A convenient way to incorporate the soil release polymers in such products is as granules which are primarily composed of the polymer. The polymer granules can be dry-blended with laundry detergent granules or/and other granules at desired ratios. Stability of the polymers is generally enhanced by having them in separate granules from some of the common laundry product components.

The soil release polymers of interest in the subject invention process are made by a synthesis process which results in molten polymer at a high temperature. In order to retain good activity of the polymer, it is desirable to cool the polymer quickly in order to retain it in an amorphous state and not allow it to transform into a crystalline state.

It is an object of the subject invention to provide a process for making soil release polymer granules from hot, molten polymer, that can be readily used for commercial scale production of the granules.

It is a further object of the subject invention to provide such a process wherein most of the polymer is retained in its amorphous state.

It is also an object of the subject invention to provide soil release polymer granules of suitable size, bulk density, and stability for dry blending with detergent granules in dry laundry products.

SUMMARY OF THE INVENTION

The subject invention involves processes for making granular compositions comprising soil release polymers, the polymers comprising at least about 10% of substantially linear esters having a backbone; the esters being uncapped or end-capped on one or both ends of the backbone; the esters comprising in their backbones oxyalkyleneoxy units and hydrophobic aryldicarbonyl units; the esters having a molecular weight of from about 500 to about 20,000; the polymers if in solid state having the tendency when exposed to moisture to spontaneously rearrange, in time, from an amorphous form which is readily soluble in water to a crystalline form which is relatively insoluble in water; the process comprising the following steps:

a) taking the soil release polymers, in which are dispersed from 0% to about 25% alkylaryl or alkyl sulfonate stabilizers, in molten state at a temperature of at least about 180° C., and rapidly dissolving the molten polymers in water, forming an aqueous polymer solution having a polymer concentration of up to about 50%, the average temperature of the solution being maintained below about 50° C.;

b) dispersing a nonionic surfactant in the molten polymers or in the water prior to step a), the surfactant being an alkylethoxy alcohol nonionic surfactant which is a condensation product of alkylalcohol and ethylene oxide, the alkyl portion being linear or branched, saturated or unsaturated, having from about 8 to about 22 carbon atoms, there being on average of from about 10 to about 100 moles ethoxy per mole surfactant, the nonionic surfactant being from about 2% to about 20% of the aqueous polymer solution, on a dry weight basis; and c) drying the aqueous polymer solution of b), thereby producing a granular composition having a water content of less than about 3%.

The subject invention also involves soil release polymer granules comprising such polymers and nonionic surfactant and, optionally, stabilizers.

DETAILED DESCRIPTION OF THE INVENTION

Figure 1:
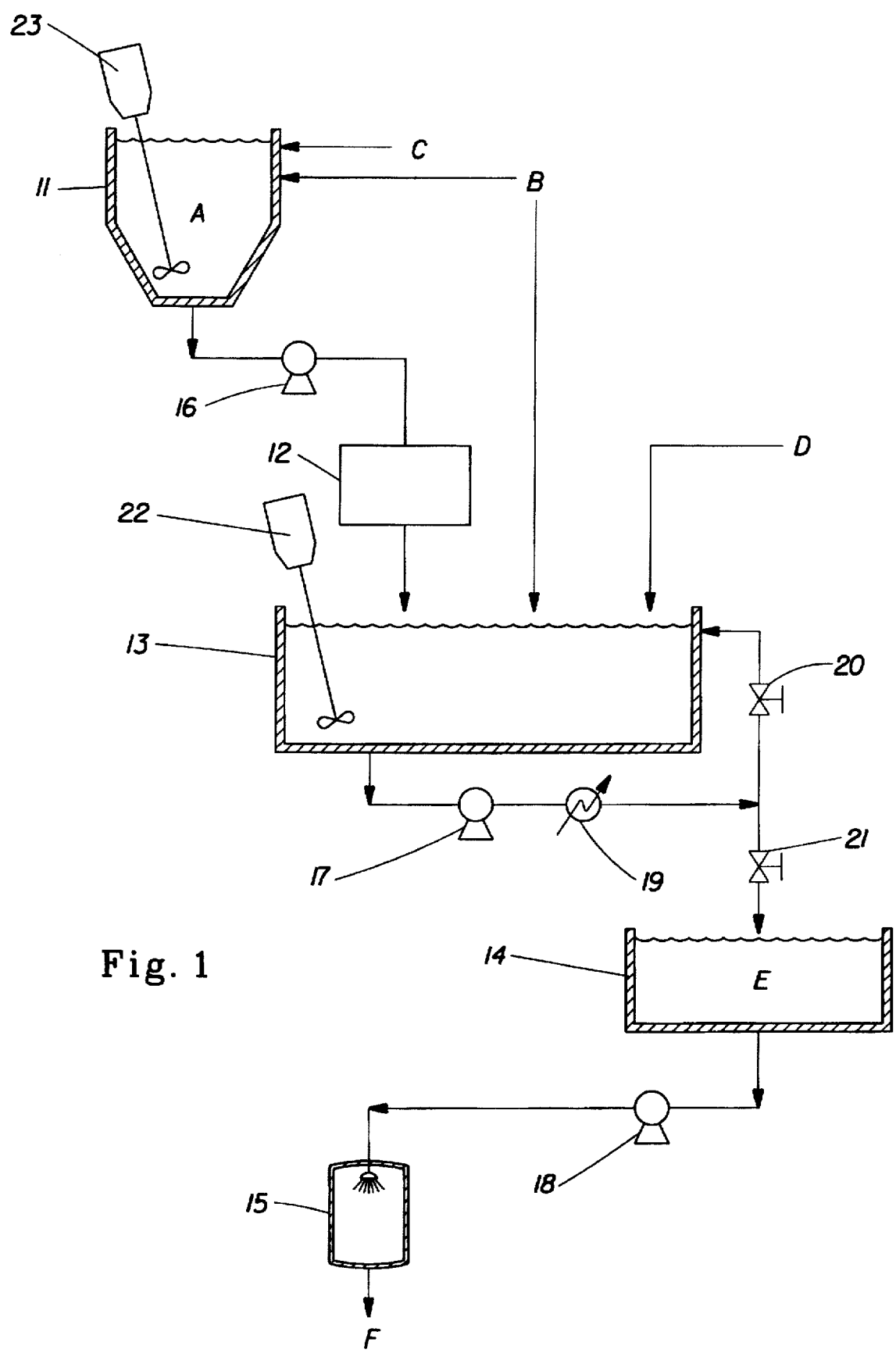
FIG. 1 is a schematic flow chart of a batch process of the subject invention.

The subject invention involves processes for making particles containing soil release polymers, starting from the hot, molten polymer.

Many soil release polymers are made by processes which result in the polymer being present in a hot, molten state. Preferred soil release polymers of this type are disclosed in U.S. Pat. Nos. 4,877,896 issued to Maldonado, Trinh and Gosselink on Oct. 31, 1989; 5,196,133 issued to Leslie and Clauss on Mar. 23, 1993; 5,182,043 issued to Morrall, Gosselink, Pan and Nayar on Jan. 26, 1993; and 5,415,807 issued to Gosselink, Pan, Kellett and Hall on May 16, 1995, all of which are incorporated herein by reference.

All percentages herein are given on a weight basis, unless expressly otherwise indicated.

As used herein, "alkyl" means a hydrocarbyl chain, linear or branched, saturated or unsaturated. Unless otherwise indicated, alkyl are preferably linear, preferably saturated or unsaturated with one or two double bonds, more preferably saturated.

As used herein, "aryl" means an aromatic hydrocarbyl ring. Preferred aryl are phenyl and naphthyl, especially phenyl. "Alkylaryl" means aryl substituted with one or more alkyl.

Taken in their broadest aspect, the soil release polymers of the subject processes encompass an oligomeric ester backbone which is preferably end-capped on at least one end, more preferably both ends, of the backbone by end-capping units. The end-capping units are anionic hydrophiles, connected to the ester backbone by means of aroyl groups or by an ester or ether linkage. Preferably, the anion source is a sulfonated group.

Polymers of the subject invention processes encompass oligomeric (low molecular weight polymeric), substantially linear uncapped or end-capped esters. These esters comprise, in their backbones, oxyalkyleneoxy, preferably oxy-1,2-propyleneoxy and oxyethyleneoxy, units, and hydrophobic aryldicarbonyl, preferably terephthaloyl, units. Preferred esters additionally comprise units of sulfoisophthalate and, optionally, poly(oxyethylene)oxy units having a degree of polymerization from about 2 to about 4. Mixtures of such esters with reaction by-products and the like retain their utility as fabric soil release agents when such mixtures contain at least about 10%, preferably at least about 25%, more preferably at least about 50%, by weight, of the subject esters. The esters useful herein are of relatively low molecular weight (i.e., generally below the range of fiber-forming polyesters) typically ranging from about 500 to about 20,000, preferably from about 550 to about 8000, also preferably from about 650 to about 2500.

Preferred end-capping units include sulfoaroyl units, especially sulfobenzoyl units of the formula $(MO_3S)(C_6H_4)$ $C(O)$—, wherein M is a salt-forming cation such as sodium or tetraalkylammonium, preferably sodium. Preferably not more than about 0.15 mole fraction of the sulfobenzoyl end-capping units are in para-form. More preferred are the sulfobenzoyl end-capping units being essentially in ortho- or meta-form.

Preferred end-capping units include those derived from sulfonated polyethoxy/propoxy groups, which are connected to the backbone by an ester linkage. Preferred are those of the formula $(MO_3S)(CH_2)_m(R'O)_n$—, wherein M is a salt-forming cation such as sodium or tetraalkylammonium; m is 0 or 1, preferably 0; R' is ethylene, propylene, or a mixtures thereof, preferably ethylene; and n is on average from 1 to about 20, preferably about 1–5. More preferred are capping units derived from using monomers selected from sodium 2-(2-hydroxyethoxy)ethanesulfonate, sodium 2-(2 (hydroxyethoxy)ethoxy)ethanesulfonate, and 2-(2-(2-(hydroxyethoxy)ethoxy)ethoxy)ethanesulfonate.

Preferred end-capping units include ethoxylated or propoxylated phenolsulfonate units of the formula $MO_3S$ $(C_6H_4)(OR')_p$—, wherein M and R' are as defined above, and p is from about 1 to about 20, preferably from about 2 to about 10.

Preferred end-capping units include modified poly (oxyethylene)oxy monoalkyl ether units of the formula $R"O(CH_2CH_2O)_k$—, wherein R" is about $C_1$–$C_4$, preferably about $C_1$–$C_2$, saturated alkyl, and k is from about 3 to about 100, preferably from about 5 to about 50.

Preferred end-capped esters are essentially in the doubly end-capped form, comprising about 2 moles of the end-capping units per mole of the ester.

The ester "backbone" of the subject polymers, by definition, comprises all the units other than the end-capping units, all the backbone units incorporated into the esters being interconnected by means of ester bonds.

The essential oxyalkyleneoxy units of the backbone of the subject polymers are mixtures of symmetrical (a) —$OCH_2CH_2O$— (oxyethyleneoxy) units with unsymmetrical (b) —$OCH(R^a)CH(R^b)O$— (oxy-1,2-alkyleneoxy) units, wherein $R^a$ and $R^b$ are selected so that in each of the units, one of $R^a$ or $R^b$ is H and the other is a non-hydrogen R group (as specified below), or $R^a$ and $R^b$ are different non-hydrogen R groups. For preferred (b) units, one of $R^a$ or $R^b$ is H. The (b) units are believed to provide a sufficiently unsymmetrical character required for stability of the desired amorphous physical form of the soil release polymers, whereas the (a) units are believed to provide sufficient symmetry for soil release activity. A convenient measure of the unsymmetrical character required is given by the mole ratio of (a) units to (b) units. For the subject invention processes, the ratio of (a) units to (b) units in the subject polymers preferably varies from about 1:2 to about 4:1. At a ratio of greater than about 4:1, the polymers spontaneously change from amorphous to crystalline form quickly, and are not useful in commercial scale processes where concentrated aqueous solutions are prepared and kept for more than a few minutes. At a ratio less than about 1:2, the polymers have little tendency to change from amorphous to crystalline form. More preferred ratios of (a) units to (b) units in the subject polymers is from about 1:1 to about 3:1, more preferred still from about 1.3:1 to about 2:1.

In the above paragraph, R is preferably a nonhydrogen, noncharged group, has low molecular weight (typically below about 500), is chemically unreactive (especially in that it is a nonesterfiable group), and is comprised of C and H, or of C,H and O. The preferred R groups are selected from lower n-alkyl groups, such as methyl, ethyl, propyl and butyl, especially methyl. Thus, the preferred oxy-1,2-alkyleneoxy units are oxy-1,2-propyleneoxy, oxy-1,2-butyleneoxy, oxy-1,2-pentyleneoxy and oxy-1,2-hexyleneoxy units. Especially preferred are oxy-1,2-propyleneoxy as (b) units.

The backbones of the subject esters comprise, per mole of ester, from about 0.5 to about 66 moles of the oxyalkyleneoxy units, preferably from about 1 to about 22 moles, more preferably from about 3 to about 16 moles.

Certain noncharged, hydrophobic aryldicarbonyl units are in the backbone of the subject polymers. Preferably, these are exclusively terephthaloyl units. Other noncharged, hydrophobic dicarbonyl units, such as isophthaloyl, adipoyl, or the like, can also be present if desired, provided that the soil release properties of the esters (especially polyester substantivity) are not significantly diminished. These other, noncharged, hydrophobic dicarbonyl units can aid in providing sufficient irregularity in the subject esters to avoid a too great tendency to crystallize.

The backbones of the subject esters comprise, per mole of ester, from about 1 to about 40 moles of the hydrophobic aryldicarbonyl units, preferably from about 2 to about 24 moles, more preferably from about 3 to about 14 moles.

Generally, if it is desired to modify the units of the esters, use of additional hydrophilic units is preferable to use of additional noncharged, hydrophobic units. For this, minor amounts, preferably comprising less than about 5% of the molecular weight of the ester, of additional units such as di- or tri- (oxyethylene)oxy units are incorporated into the esters.

It is also possible to introduce charged, hydrophilic units into the backbone; preferably such units comprise less than about 20%, more preferably less than about 14% of the backbone units. One example is to incorporate a charged moiety $R^c$ in place of one or more $R^a$ or $R^b$ moieties of the above oxy-1,2-alkyleneoxy units. Such $R^c$ moiety preferably has the structure $MO_3SL$—, wherein M is a salt-forming cation such as sodium or tetraalkylammonium, and L is a side chain connecting moiety selected from alkylene, oxyalkylene, alkyleneoxyalkylene, arylene, oxyarylene, alkyleneoxyarylene, poly(oxyalkylene), oxyalkyleneoxyarylene, poly(oxyalkylene)oxyarylene, alkylenepoly(oxyalkylene), and mixtures thereof. As used in this paragraph, alkylene are about $C_2$–$C_6$, preferably ethylene or 1,2-propylene; arylene is preferably phenylene.

As another example, anionic hydrophilic units capable of forming two ester bonds may be included in the backbone of the esters. Suitable anionic hydrophilic units of this specific type are well illustrated by sulfonated dicarbonyl units, such as sulfosuccinyl, i.e.,

or more preferably, sulfoisophthaloyl, i.e., —(O)C($C_6H_3$)($SO_3M$)C(O)— wherein M is a salt-forming cation, such as an alkali metal or tetraalkylammonium ion.

The backbones of the subject esters comprise, per mole of ester, from 0 moles to about 20 moles of sulfonated dicarbonyl units, preferably from about 0.5 moles to about 9 moles, more preferably from about 1 moles to about 4 moles.

Preferred soil release polymer esters useful in the subject processes comprise, per mole of the esters, (i) from about 1 to about 2 moles of sulfoaroyl end-capping units, preferably sulfobenzoyl end-capping units of the formula ($MO_3S$)($C_6H_4$)C(O)—, wherein M is a salt-forming cation such as an alkali metal or tetraalkylammonium; or from about 1 to about 2 moles of sulfonated poly-ethoxy/propoxy end-capping units of the formula ($MO_3S$)($CH_2$)$_m$($CH_2CH_2O$)(R'O)$_n$—, wherein M is a salt-forming cation such as sodium or tetraalkylammonium, m is 0 or 1, R' is ethylene, propylene or a mixture thereof, and n is from 0 to about 4;

ii) from about 0.5 to about 66 moles of backbone units selected from:
  a) a mixture of oxyethyleneoxy and oxy-1,2-alkyleneoxy, preferably oxy-1,2-propyleneoxy, units, wherein the units are present in an oxyethyleneoxy to oxy-1,2-alkyleneoxy mole ratio ranging from about 4:1 to about 1:2; and
  b) a mixture of a) with poly(oxyethylene)oxy units wherein the poly(oxyethylene)oxy units have a degree of polymerization of from 2 to 4; provided that when the poly(oxyethylene)oxy units have a degree of polymerization of 2, the mole ratio of poly(oxyethylene)oxy units to total group ii) units ranges from 0:1 to about 0.33:1; and when the poly(oxyethylene)oxy units have a degree of polymerization of 3, the mole ratio of poly(oxyethylene) oxy units to total group ii) units ranges from 0:1 to about 0.22:1; and when the poly(oxyethylene)oxy units have a degree of polymerization of 4, the mole ratio of poly(oxyethylene)oxy units to total group ii) units ranges from 0:1 to about 0.14:1;

iii) from about 1 to about 40 moles of backbone hydrophobic aryldicarbonyl, preferably terephthaloyl, units; and iv) from 0 to about 30 moles of backbone anionic dicarbonyl units, preferably 5-sulfoisophthaloyl units of the formula —(O)C($C_6H_3$)($SO_3M$)C(O)—, wherein M is a salt forming cation such as an alkali metal or tetraalkylammonium ion.

A preferred type of polymer is illustrated by one comprising at least about 25%, preferably from about 50% to about 100%, by weight, of ester having the empirical formula (CAP)$_x$(EG/PG)$_y$(T)$_z$; wherein (CAP) represents the sodium salt form of sulfobenzoyl end-capping unit from (i); (EG/PG) represents oxyethyleneoxy and oxy-1,2-propyleneoxy units from (ii); (T) represents terephthaloyl units from (iii); x is from about 1 to about 2, preferably about 2; y is from about 2.25 to about 9, preferably to about 7, more preferably to about 5.5; z is from about 1.25 to about 8, preferably to about 6, more preferably to about 4.5; wherein x, y and z represent the average number of moles of the corresponding units per mole of the ester. In compositions of this type, the oxyethyleneoxy:oxy-1-2-propyleneoxy mole ratio preferably ranges from about 1:2 to about 4:1, more preferably from about 1:1 to about 3:1, also preferably from about 1.3:1 to about 2.5:1. These ester molecules (oligomers) preferably have molecular weights ranging from about 600 to about 2,000, more preferably from about 700 to about 1800, more preferably still from about 800 to about 1500.

Another preferred polymer is illustrated by one comprising at least about 25%, preferably from about 50% to about 100%, by weight, of ester having the empirical formula (CAP)'$_d$(EG/PG)'$_e$(T)'$_f$; wherein (CAP)' represents the sodium salt form of sulfonated polyethoxy/propoxy end-capping units from i); (EG/PG)' represents oxyethyleneoxy, oxy-1,2-propyleneoxy, and poly(oxyethylene)oxy units from ii); (T)' represents terephthaloyl units from iii); d is from about 1 to about 2, preferably about 2; e is from about 0.5 to about 7, preferably from about 1 to about 6; f is from about 1.5 to about 7, preferably from about 2 to about 6; wherein d, e and f represent the average number of moles of the corresponding units per mole of the ester. In compositions of this type, the oxyethyleneoxy:oxy-1,2-propyleneoxy mole ratio preferably ranges from about 1:2 to about 4:1, more preferably from about 1:1 to about 1:3. These ester molecules (oligomers) preferably have molecular weights ranging from about 500 to about 2,500, more preferably from about 800 to about 1500.

As disclosed hereinabove, the backbone of the esters herein are preferably modified by incorporation of hydrophiles such as 5-sulfoisophthalate. This provides compositions such as those comprising at least about 25%, preferably from about 50 to about 100%, by weight, of ester having the empirical formula (CAP)"$_r$(EG/PG)"$_s$(T)"$_t$(SIP)$_q$; wherein (CAP)", (EG/PG)", and (T)" are as defined for (CAP) and (CAP)', (EG/PG) and (EG/PG)', and (T) and (T)', respectively, in the preceding paragraphs, and (SIP) represents the sodium salt form of 5-sulfoisophthaloyl units from iv); r is from 0 to about 2, preferably about 2; s is from about 0.5 to about 66, preferably from about 2.25 to about 39, more preferably from about 3 to about 18; t is from about 1 to about 40, preferably from about 1.5 to about 34, more preferably from about 3 to about 15; q is from about 0.05 to about 26, preferably from about 0.5 to about 18, more preferably from about 1 to about 4; wherein r, s, t and q represent the average number of moles of the corresponding units per mole of said ester. In these polymers, the oxyethyleneoxy:oxy-1,2-propyleneoxy mole ratio preferably ranges from about 1:2 to about 4:1, more preferably from about 1:1 to about 3:1. In a highly preferred polymer where (CAP)" represents sulfonated poly-ethoxy/propoxy units, r is about 2, s is about 5, t is about 5, q is about 1. In a highly preferred polymer where (CAP)" represents sulfobenzoyl units, r is about 2, s is about 14, t is about 11 and q is about 2. Excellent soil release compositions of these types are those wherein the ester has a molecular weight ranging from about 500 to about 20,000, preferably from about 800 to about 5000, and the ratio of EG/PG in the backbone is from about 1.3:1 to about 2.3:1, preferably from about 1.5:1 to about 1.9:1.

Examples of preferred polymers of the subject invention processes include the following:

Polymer J

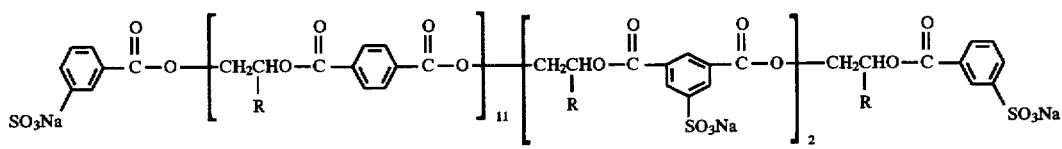

wherein R = H or CH₃ in about 2:1 ratio, respectively;

Polymer K

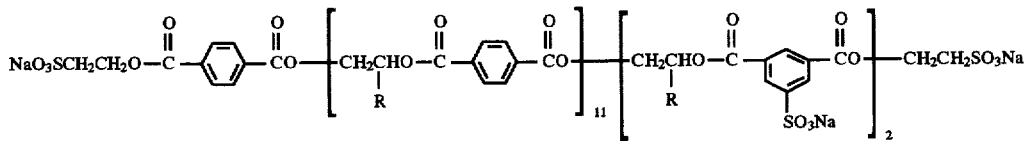

wherein R = H or CH₃ in about 2:1 ratio, respectively;

Polymer L

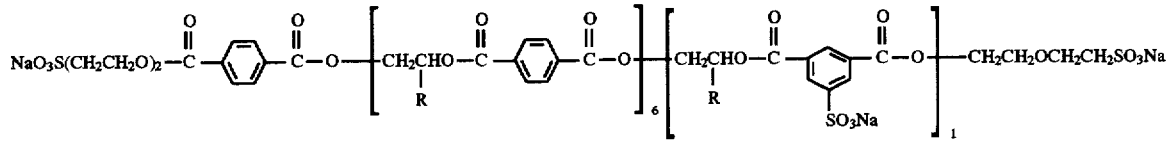

wherein R=H or CH₃ in about 1.7:1 ratio, respectively.

The processes of the subject invention begin with the soil release polymers in molten state, preferably at a temperature of at least about 180° C., more preferably from about 185° C. to about 280° C., more preferably still from about 190° C. to about 260° C., also preferably from about 200° C. to about 250° C.

At lower temperatures, the soil release polymers of the subject invention processes have a solid state amorphous form which is readily water-soluble and is useful as a soil-release polymer, and a solid state crystalline form which is not very water-soluble and is therefore inactive as a soil-release polymer. The amorphous form has the tendency to spontaneously change, in time, to the crystalling form, when the amorphous form is exposed to moisture, such as a humid atmosphere.

Even at their high molten temperatures, the subject polymers are quite viscous and are difficult to transfer from the reaction vessel in which they are typically made. It has been found that the addition of certain crystallization-reducing stabilizers to the molten polymers help reduce their viscosity. Addition of such stabilizers to the polymers helps slow any transition of the polymers to the crystalline form and improves dissolution of the combination in aqueous media. Such stabilizers are disclosed in U.S. Pat. No. 5,415,807.

The crystallization-reducing stabilizers useful in the subject processes include sulfonate-type stabilizers, such as linear or branched alkylbenzene sulfonates, paraffin sulfonates, and other thermally-stable alkyl sulfonate variations. Preferred stabilizers are alkylaryl or alkyl sulfonates, preferably selected from:

1) alkylaryl sulfonates selected from:
   a) $(R^3)Ar—SO_3M$;
   b) $(R^1)_nAr—SO_3M$;
   c) $(R^2)Ar(SO_3M)—O—(R^2)Ar(SO_3M)$; and
   d) mixtures thereof,
   wherein Ar is aryl, preferably phenyl; $R^3$ is about $C_5–C_{18}$ alkyl, preferably on average about $C_9–C_{13}$; each $R^1$ is about $C_1–C_4$ alkyl; each $R^2$ is about $C_1–C_{18}$ alkyl, preferably on average about $C_{10}–C_{18}$; n is from 0 to 3, preferably 1 or 2; and M is an alkali metal (e.g. sodium or potassium) or tetraalkylammonium ion, preferably sodium;

2) alkyl sulfonates including paraffin sulfonates and other thermally-stable alkyl sulfonate variations, such as olefin sulfonates and beta-alkoxysulfonates, with about 4 to about 20 carbon atoms, preferably about 8 to about 18 carbon atoms; provided the alkyl sulfonates are substantially free of substituents capable of entering into esterification/transesterification reactions under the conditions used for forming the soil release agents; and 3) mixtures thereof.

More preferred stabilizers are the alkylaryl sulfonates, especially the alkylbenzene sulfonates of 1) a) and b) above. Particularly preferred stabilizers include, for example, sodium dodecylbenzene sulfonate, sodium cumene sulfonate, sodium toluene sulfonate, sodium xylene sulfonate, and mixtures thereof. When higher levels of stabilizers are used, mixtures are preferred over pure components to insure full integration into the polymer and to reduce the possibility of crystallization of the stabilizers.

To substantially affect the viscosity of the molten polymer, the quantity of stabilizers added to the polymer is preferably from about 2% to about 25%, more preferably from about 3% to about 16%, more preferably still from about 4% to about 12%, still more preferably from about 5% to about 8%.

The stabilizers may be added to the soil release polymers at a convenient stage during the making of the polymers, or preferably to the molten polymer after its synthesis is completed.

U.S. Pat. No. 5,182,043, in columns 7–10 indicates that the soil release polymers must be substantially amorphous in character at the time they are introduced into aqueous laundering solutions. This desired amorphous form of such polymers will spontaneously rearrange into a crystalline form which is inactive as a soil release polymer in aqueous laundering solutions. This patent states that rapid cooling of the hot molten polymer and exclusion from water will maintain such polymers in the amorphous form. Despite the admonition of the '043 patent to avoid contact of the polymer with water, the preferred practical way to achieve such quick cooling of polymer for commercial scale processes is to quench the molten polymer in water.

Quenching of the molten polymer in water preferably results in a concentrated solution of the water-soluble polymer in water. In order to rapidly quench the molten polymer, a means of rapidly dispersing the molten polymer in the quenching solution is preferably used. Rapid dissolution of the polymer in the quenching solution can be achieved by employing a means for breaking up the viscous polymer as it flows into the quench solution, or/and vigorous mixing means in the quench solution to rapidly disperse the viscous polymer. Preferably a high-shear apparatus is used to aid dispersion of the molten polymers and their subsequent dissolution in the quench solution.

Dissolution of the polymer in the quench solution may take place in a batch process, a semi-continuous process, or a continuous process. The maximum or final concentration of the polymer in the quench solution is preferably up to about 50%, more preferably from about 25% to about 40%, more preferably still from about 30% to about 38%, still more preferably from about 34% to about 37%. The solution also comprises any crystallization-reducing stabilizers previously added to the polymer. Also, such stabilizers can alternatively be added directly to the quench solution either before or after addition of the polymer.

Dispersion and dissolution of the polymer occurs better in warmer water. The hot polymer entering the quench solution causes temperature gradients in the quench solution which aids dissolution. For dissolution, solution temperature, at least locally where dissolution is occurring, is preferably from about 10° C. to about 70° C., more preferably from about 25° C. to about 50° C., more preferably still from about 30° C. to about 40° C.

In order to minimize transformation of the polymer from amorphous to crystalline form, the quench solution is preferably continuously cooled during addition of the molten polymer to prevent a continuous warming of the solution. The viscosity of the quench solution increases with time, but lower temperatures slow the rate of viscosity increase. The average temperature of the quench solution is preferably maintained at less than about 50° C., more preferably from about 10° C. to about 40° C., more preferably still from about 15° C. to about 30° C. Preferable further cooling of the quench solution after dissolution of the polymer is complete reduces the solution temperature further; preferably to less than about 30° C., more preferably to less than about 20° C., more preferably still to from about 0° C. to about 15° C.

The quench solution of the subject invention processes also comprises an alkylethoxy alcohol nonionic surfactant which is a condensation product of alkyl alcohol with ethylene oxide. The alkyl portion of such nonionic surfactant is an alkyl chain which can be either linear or branched, saturated or unsaturated, containing from about 8 to about 22 carbon atoms, with an average of from about 12 to about 18 carbon atoms. Preferably the alkyl portion of such nonionic surfactant contains an average of from about 12 to about 15 carbon atoms, also preferably from about 16 to about 18 carbon atoms. Preferably the alkyl portion of such nonionic surfactants are linear. Typically the nonionic surfactants useful herein are made from fatty alcohols derived from natural fat and oil sources, such as tallow, lard, coconut oil, soybean oil, palm stearin oil, palm kernel oil, etc. Mixtures of such alkyl chains are referred to herein by referring to such sources. All the fatty moieties from such a source can be used, or only part (or a "cut"), of fatty moieties having the chain length and degree of saturation desired. Unsaturated moieties can be hydrogenated to make them more or completely saturated.

The term "tallow", as used herein, means alkyl moieties derived therefrom, where the alkyl mixture is typically derived from fatty acids having an approximate distribution of about 2–4% myristic, 25–35% palmitic, 20–25% stearic, 1–3% palmitoleic, 35–45% oleic, and 2–4% linoleic. Other sources with similar alkyl distributions, such as those derived from palm stearin oil and from various animal tallows and lard, are also included within the term "tallow". The tallow can also be hardened (i.e., hydrogenated) to convert all or part of the unsaturated alkyl moieties to saturated alkyl moieties.

The term "coconut" as used herein, means alkyl moieties derived from coconut oil, where the alkyl mixture is typically derived from fatty acids having an approximate distribution of about 5–10% caprylic, 5–10% capric, 45–55% lauric, 15–20% myristic, 5–10% palmitic, 1–3% stearic, 5–10% oleic, and 1–3% linoleic. Other sources with similar alkyl distributions, such as those derived from palm kernel oil and babasu oil, are included within the term "coconut".

For the subject nonionic surfactants, the number of moles of ethoxy per mole of surfactant is, on average, from about 10 to about 100, preferably from about 25 to about 80, more preferably from about 35 to about 70, more preferably still from about 40 to about 60.

The nonionic surfactants useful in the subject invention processes preferably have a melting point above about 25° C., more preferably from about 40° C. to about 75° C., more preferably still from about 50° C. to about 60° C.

If the nonionic surfactant does not begin to decompose at the temperature of the molten polymer, it can be blended with the molten polymer prior to quenching in water. This has the advantage of helping to reduce the viscosity of the molten polymer. This can reduce or eliminate the need to add crystallization-reducing stabilizers to the molten polymer to achieve viscosity reduction. Alternatively, the nonionic surfactant can be dispersed or/and dissolved in the quench water, preferably prior to addition of the molten polymer to the quench water.

With the nonionic surfactant present, the polymer quench solution exhibits a slower rate of viscosity increase upon aging (prior to polymer drying) than solutions without the nonionic surfactant present. This is important because increasing solution viscosity is directly related to increasing polymer crystallinity, and inversely related to polymer soil release performance. Maintaining a low solution viscosity is also important in the polymer drying process, because it is generally desirous to spray small droplets of polymer solution in the drying apparatus. As the solution viscosity increases it becomes more difficult to control the atomization of the solution and obtain proper particle size and optimum drying performance.

The amount of the nonionic surfactant in the polymer quench solution, expressed on a dry weight percent basis, is from about 2% to about 20%, preferably from about 3% to about 12%, more preferably from about 4% to about 10%, still more preferably from about 5% to about 8%. On the same dry basis, the amount of nonionic surfactant plus crystallization-reducing stabilizers in the quench solution is from about 6% to about 30%, preferably from about 8% to about 20%, more preferably from about 10% to about 17%, more preferably still from about 11% to about 14%.

In order to minimize the conversion of the polymer from the amorphous form to a crystalline form, the time which the polymer is retained in aqueous solution is kept to a minimum, and the temperature of the aqueous solution is kept as low as practical. Even so, for processing of preferred polymers, the polymers can be retained in such quench solution for several days prior to drying, while retaining greater than about 75%, preferably greater than about 90%, more preferably greater than about 95%, of the polymer in the amorphous form.

The quench solution is dried by a means which provides particles of the soil release polymer which can be readily blended with detergent-containing granules to provide a granular laundry product. A highly preferred drying means is a spray dryer which is used in its normal manner to produce granules of the soil release polymers. The resulting granules are dried to a moisture content of less than about 3%, preferably less than about 2%, more preferably from 0% to about 1%.

The dried granules are preferably passed through a large mesh screen (e.g., having about 833 micron openings or somewhat larger). Oversized product is retained on the large mesh screen, collected, and gently ground; then it is recycled onto the large mesh screen. The granules are also preferably passed over a small mesh screen (e.g., having about 246 micron openings or somewhat smaller). Fine particles passing through the small mesh screen are preferably recycled into polymer solution for reprocessing (e.g., in a previous stream or tank or in a subsequent batch).

The granules produced by subject processes preferably have a bulk density of from about 300 g/l to about 850 g/l, more preferably from about 400 g/l to about 800 g/l, more preferably still from about 500 g/l to about 700 g/l.

The granules produced by the subject processes preferably have a particle size distribution such that at least about 95% of the polymeric granules pass through a screen having about 833 micron openings but are at least about 90% retained on an about 246 micron-opening screen, more preferably at least about 98% pass through an about 833 micron-opening screen but at least about 95% are retained on an about 246 micron-opening screen. Preferably no more than about 1% of the granules pass through an about 75 micron-opening screen.

The resulting granules comprise from about 70% to about 94% soil release polymer, preferably from about 82% to about 91%, more preferably from about 85% to about 89%; from about 2% to about 20% nonionic surfactant, preferably from about 3% to about 10%, more preferably from about 5% to about 8%; from 0% to about 25% crystallization-reducing stabilizers, preferably from about 3% to about 14%, more preferably from about 5% to about 10%; and less than about 3% water, preferably less than about 2%, more preferably from 0% to about 1%. The granules preferably comprise nonionic surfactant plus such stabilizers of from about 6% to about 30%, more preferably from about 8% to about 20%, more preferably still from about 10% to about 17%, still more preferably from about 11% to about 14%.

FIG. 1 depicts a batch process of the subject invention. A batch of molten soil release polymer A is made and retained in polymer reaction vessel 11. Stabilizers C are optionally added to the molten polymer in vessel 11 and uniformly blended into the polymer using mixer 23.

Molten polymer A is pumped from vessel 11 using pump 16 through a disperser 12 which cuts the molten polymer into smaller segments and drops these molten polymer segments into water D contained in quench tank 13. The molten polymer is rapidly dissolved in the water by vigorous agitation with mixer 22. Nonionic surfactant B can optionally be added to molten polymer A in vessel 11, if the surfactant is stable at the molten polymer temperature, or otherwise is added to the water D in quench tank 13 prior to pumping of the molten polymer into tank 13. During the addition of the molten polymer to quench tank 13, pump 17 continuously cycles the aqueous polymer solution through heat exchanger 19 and open valve 20 back into quench tank 13, in order to retain the average temperature of the aqueous polymer solution in tank 13 preferably below about 35° C. When pumping of the molten polymer from vessel 11 into quench tank 13 has been completed, circulation and cooling of the solution is continued until its temperature is preferably below about 20° C. When the desired temperature for the aqueous polymer solution has been reached, valve 20 is closed and valve 21 is opened so that the aqueous polymer solution E flows into storage tank 14.

Aqueous polymer solution E is pumped from storage tank 14 by pump 18 into spray dryer 15 where most of the water is removed from the polymer solution and polymer granules F are produced, the granules flowing out of spray dryer 15 to screening, grinding of oversize particles if necessary, and storage. Fines can be recycled.

Figure 2:
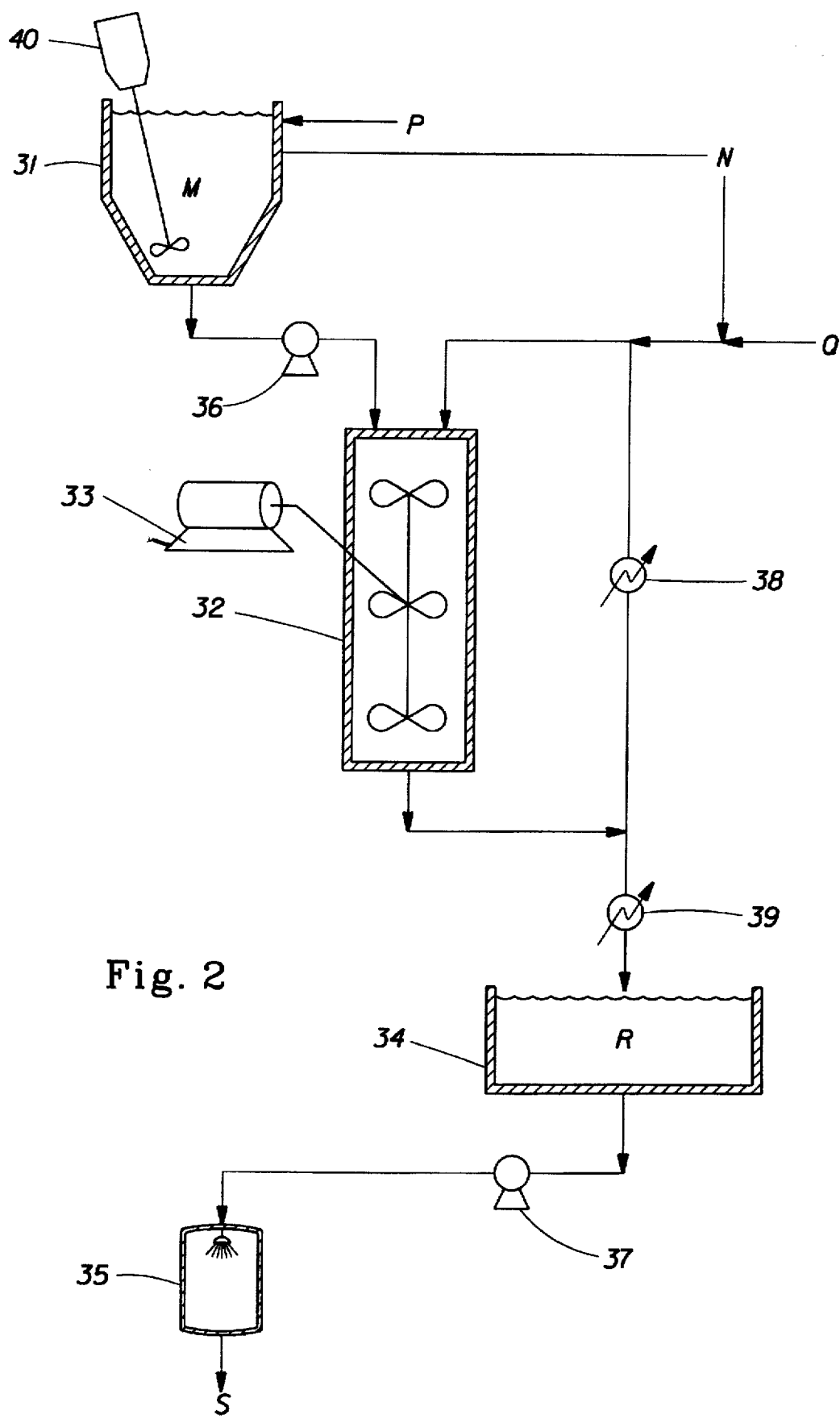
FIG. 2 is a schematic flow chart of a semi-continuous process of the subject invention.

FIG. 2 depicts a semi-continuous process of the subject invention. Molten polymer M is made and retained in polymer reaction vessel 31. Stabilizers P are optionally added to the molten polymer and uniformly blended therein using mixer 41.

Molten polymer M is pumped from vessel 31 using pump 36 into a section of pipe housing high-shear pipeline mixer 32 where it is rapidly dispersed into an aqueous polymer solution. Water Q is also fed into the pipeline mixer. Nonionic surfactant N can optionally be dispersed in the molten polymer M in vessel 31, if the surfactant is stable at the temperature of the molten polymer, or otherwise it is added to the stream of water Q, thus entering the high-shear pipeline mixer with the water. A portion of the aqueous polymer solution exiting high-shear pipeline mixer 32 is recycled to the mixer through heat exchanger 38 which cools the solution. The remainder of the aqueous polymer solution R flows through heat exchanger 39 for cooling and into storage tank 34. Preferred temperatures for these solution streams are as provided for the corresponding solution streams in the batch process above.

Aqueous polymer solution R is pumped from storage tank 34 to spray dryer 35 where most of the water is removed and polymer granules S are produced, the granules flowing out of spray dryer 35 to screening, grinding of oversize particles if necessary, and storage. Fines can be recycled.

The following is a non-limiting example of the subject invention process.

EXAMPLE

Polymer L hereinabove is synthesized in a reaction vessel, according to the formulation and general procedure disclosed in Example V of U.S. Pat. No. 5,415,807 (except for the modest difference of EG/PG which requires alteration of the amounts of ethylene glycol and propylene glycol monomers). The ester composition is made from sodium 2-(2-hydroxyethoxy)-ethanesulfonate, dimethyl terephthalate, dimethyl 5-sulfoisophthalate, sodium salt, ethylene glycol and propylene glycol. To improve fluidity and solubility of the finished polymer, an equal weight blend of 3 stabilizers, sodium dodecylbenzene sulfonate, sodium toluene sulfonate and sodium cumene sulfonate, are added to the polymer melt. The amount of mixed stabilizer is 6%, by weight, of the polymer. This 6% mixed stabilizer replaces the 12% linear sodium dodecyl benzenesulfonate stabilizer in Example V of U.S. Pat. No. 5,415,807. The temperature of the polymer/stabilizer melt in the vessel at the conclusion of the synthesis is about 200° C.

A quench solution of water with alkylethoxy alcohol nonionic surfactant ($C_{12-15}$, 50 ethoxy per mole) pre-dissolved in the water is prepared at a temperature of 35° C. The Polymer L/stabilizer melt is quickly emptied from the vessel in a molten state into the quench solution with agitation, forming a single phase solution in about 100 minutes. The temperature of the solution is maintained at 35° C. The resulting aqueous solution contains 37% by weight of the polymer/stabilizer, and the nonionic surfactant is present at a level of 6% by weight of the polymer/stabilizer blend (approximately 2.2% by weight of the total solution).

Following the dissolution of the polymer in the aqueous quench solution, the finished solubilized polymer solution is cooled to 10° C. and is held at that temperature until drying. The cool solution, containing the nonionic surfactant, may be held for several days prior to drying. The cool solubilized polymer solution is dried in a spray dryer to remove water and form the finished granular soil release polymer composition containing 1% moisture. Oversized and undersized particles are removed by screening. The remaining granules have a bulk density of 650 g/l, 99% pass through a screen with 833 micron openings, 98% are retained on a screen with 246 micron openings, and less than 1% pass through a screen with 75 micron openings. The granules are suitable for admixing into detergent formulations.

Samples of the finished soil release polymer are tested for soil release performance as follows.

Polyester and polyester/cotton blend fabrics of several types are pretreated in a standard wash cycle with detergent wash solutions containing the soil release polymer (at a concentration of from 0.1% to 1.0% by weight of the detergent formulation). This allows the soil release polymer to "lay down" onto the fabric surface. The dried, pretreated fabrics are then soiled with 5 drops of a standard greasy/oily/dirty stain ("dirty motor oil" from the crankcase of an internal combustion engine) and the stain allowed to age a minimum of 4 hours. The stained fabrics are then washed in a standard wash cycle with detergent wash solutions (without the soil release polymer) and dried.

The stains remaining on these test fabrics are compared to those on control fabrics that were stained and washed the same but were pretreated with a wash without soil release polymer. A series of measurements are made with a Hunter Mini-Scan Spectrophotometer unit, Model MS/S 4500L; L, a, and b readings in the immediate area of the stain are taken on the test and control fabrics. Three (3) sets of L, a, and b data are recorded for the fabric swatches, in the "clean" (initial), "soiled" and "washed" conditions. The data is recorded as $L_c$, $a_c$ and $b_c$ (clean reading); $L_s$, $a_s$ and $b_s$ (soiled reading); and $L_w$, $a_w$ and $b_w$ (washed reading).

Analysis and comparison of the color data for these three readings for the test and control fabrics show enhanced soil removal performance for fabrics treated with the soil release polymer.

While particular embodiments of the subject invention processes have been described, it would be obvious to those skilled in the art that various changes and modifications to the subject invention processes can be made without departing from the spirit and scope of the invention. It is intended to cover, in the appended claims, all such modifications that are within the scope of this invention.

What is claimed is:

1. A process for making granular compositions comprising soil release polymers, the polymers comprising at least about 10% of substantially linear esters having a backbone; the esters being uncapped or end-capped on one or both ends of the backbone; the esters comprising in their backbones oxyalkyleneoxy units and hydrophobic aryldicarbonyl units; the esters having a molecular weight of from about 500 to about 20,000; the polymers if in solid state having the tendency when exposed to moisture to spontaneously rearrange from an amorphous form which is readily soluble in water to a crystalline form which is relatively insoluble in water; the process comprising the following steps:

a) taking the soil release polymers, in which are dispersed from 0% to about 25% alkylaryl or alkyl sulfonate crystallization-reducing stabilizers, in molten state at a temperature of at least about 180° C., and rapidly dissolving the molten polymers in water, forming an aqueous polymer solution having a polymer concentration of up to about 50%, the average temperature of the solution being maintained below about 50° C.;

b) dispersing a nonionic surfactant in the molten polymers or in the water prior to step a), the surfactant being an alkylethoxy alcohol nonionic surfactant which is a condensation product of alkylalcohol and ethylene oxide, the alkyl portion being linear or branched, saturated or unsaturated, having from about 8 to about 22 carbon atoms, there being an average of from about 10 to about 100 moles ethoxy per mole surfactant, the nonionic surfactant being from about 2% to about 20% of the aqueous polymer solution, on a dry weight basis; and c) drying the aqueous polymer solution of b), thereby producing a granular composition having a water content of less than about 3%.

2. The process of claim 1 wherein the oxyalkyleneoxy units of the backbone of the polymer are a mixture of oxyethyleneoxy units with oxy-1,2-propyleneoxy units in a ratio of from about 1:2 to about 4:1.

3. The process of claim 2 wherein the end-capping units are selected from the group consisting of sulfoaroyl units, sulfonated poly-ethoxy/propoxy groups which are connected to the backbone by an ester linkage, ethoxylated or propoxylated phenolsulfonate units, and modified poly (oxyethylene)oxy monoalkyl/ether units.

4. The process of claim 3 wherein, in the following steps:

a) the polymer solution formed comprises from about 25% to about 40% said polymer;

b) the solution comprises, on a dry weight basis: from about 3% to about 12% said nonionic surfactant, the alkyl portion having from about 12 to about 18 carbon atoms, the surfactant having from about 25 to about 80 moles ethylene oxide per mole surfactant; from about 3% to about 16% said alkylaryl stabilizers; and from about 8% to about 20% said surfactant plus said stabilizers;

c) spray drying is used to dry the solution of step b), whereby the composition produced is granules having a water content of less than about 2%, and a bulk density of from about 400 g/l to about 800 g/l.

5. The process of claim 4 wherein the polymer comprises at least about 25% polymer esters having, per mole of the esters, i) from about 1 to about 2 moles of sulfobenzoyl end-capping units of the formula $(MO_3S)(C_6H_4)C(O)$—, wherein M is a salt-forming cation; or from about 1 to about 2 moles of sulfonated poly-ethoxy/propoxy end-capping units of the formula $(MO_3S)(CH_2)_m(CH_2CH_2O)(R'O)_n-$, wherein M is a salt-forming cation, m is 0 or 1, R' is ethylene or propylene or a mixture thereof, and n is from 0 to about 4;

ii) from about 0.5 to about 66 moles of backbone units selected from:
   a) a mixture of oxyethyleneoxy and, oxy-1,2-propyleneoxy units, wherein the units are present in an oxyethyleneoxy to oxy-1,2-propyleneoxy mole ratio of from about 4:1 to about 1:2; and
   b) a mixture of a) with poly(oxyethylene)oxy units wherein the poly(oxyethylene)oxy units have a degree of polymerization of from 2 to 4; provided that when the poly(oxyethylene)oxy units have a degree of polymerization of 2, the mole ratio of poly(oxyethylene)oxy units to total group ii) units ranges from 0:1 to about 0.33:1; and when the poly(oxyethylene)oxy units have a degree of polymerization of 3, the mole ratio of poly(oxyethylene)oxy units to total group ii) units ranges from 0:1 to about 0.22:1; and when the poly(oxyethylene)oxy units have a degree of polymerization of 4, the mole ratio of poly(oxyethylene)oxy units to total group ii) units ranges from 0:1 to about 0.14:1;

iii) from about 1 to about 40 moles of backbone terephthaloyl units; and iv) from 0 to about 30 moles of backbone anionic 5-sulfoisophthaloyl units of the formula $-(O)C(C_6H_3)(SO_3M)C(O)-$, wherein M is a salt forming cation.

6. The process of claim 5 wherein the stabilizers are incorporated in the molten polymers, and the nonionic surfactant is dispersed in the water prior to addition of the polymer to the water.

7. The process of claim 6 wherein the polymers comprise at least about 50% of esters having the empirical formula $(CAP)_x(EG/PG)_y(T)_z$; wherein (CAP) represents the sodium salt form of the sulfobenzoyl end-capping units from (i); (EG/PG) represents oxyethyleneoxy and oxy-1,2-propyleneoxy units from (ii); (T) represents terephthaloyl units from (iii); x is from about 1 to about 2; y is from about 2.25 to about 9; z is from about 1.25 to about 8; wherein x, y and z represent the average number of moles of the corresponding units per mole of the ester; wherein EG/PG is from about 1:1 to about 3:1; and wherein the ester molecules have molecular weights of from about 600 to about 2,000.

8. The process of claim 6 wherein the polymers comprise at least about 50% of esters having the empirical formula $(CAP)'_d(EG/PG)'_e(T)'_f$; wherein (CAP)' represents the sodium salt form of sulfonated poly-ethoxy/propoxy end-capping units from (i); (EG/PG)' represents oxyethyleneoxy, oxy-1,2-propyleneoxy units, and poly(oxyethylene)oxy units from (ii); (T)' represents terephthaloyl units from (iii); d is from about 1 to about 2; e is from about 0.5 to about 7; f is from about 1.5 to about 7; wherein d, e and f represent the average number of moles of the corresponding units per mole of the ester; wherein EG/PG is from about 1:1 to about 3:1; and wherein the ester molecules have molecular weights of from about 500 to about 2,500.

9. The process of claim 6 wherein the polymers comprise at least about 50% of esters having the empirical formula $(CAP)''_r(EG/PG)''_s(T)''_t(SIP)_q$; wherein (CAP)'' represents end-capping units from (i); (EG/PG)'' represents oxyethyleneoxy, oxy-1,2-propyleneoxy and poly(oxyethylene)oxy units from (ii); (T)'' represents terephthaloyl units from (iii); (SIP) represents 5-sulfoisophthaloyl units from (iv); r is from 0 to about 2; s is from about 0.5 to about 66; t is from about 1 to about 40; q is from about 0.05 to about 26; wherein r, s, t and q represent the average number of moles of the corresponding units per mole of the ester; wherein EG/PG is from about 1:1 to about 1:3; and wherein the ester molecules have molecular weights of from about 500 to about 20,000.

10. The process of claim 9 wherein (CAP)'' represents said sulfonated polyethoxy/propoxy end-capping units, r is about 2, s is from about 3 to about 18, t is from about 3 to about 15, q is from about 1 to about 4, EG/PG is from about 1.3:1 to about 2.3:1, and the ester molecules have molecular weights of from about 800 to about 5000.

11. The process of claim 10 wherein a high-shear apparatus is used in step a) to aid dispersion of the molten polymers and their subsequent dissolution in the solution.

12. The process of claim 7, 8, 9 or 10 wherein in step b) the solution comprises, on a dry weight basis, from about 8% to about 15% said nonionic surfactant plus said stabilizers; the nonionic surfactant having an alkyl with an average of from about 12 to about 16 carbon atoms, from about 35 to about 70 moles of ethoxy per mole of surfactant, and a melting point of from about 40° C. to about 70° C.; the stabilizers being selected from the group consisting of alkylbenzene sulfonates having one alkyl with an average of from about 9 to about 13 carbon atoms, alkylbenzene sulfonates having one or two alkyl with an average of from about 1 to about 4 carbon atoms, and mixtures thereof.

* * * * *